Patented May 26, 1936

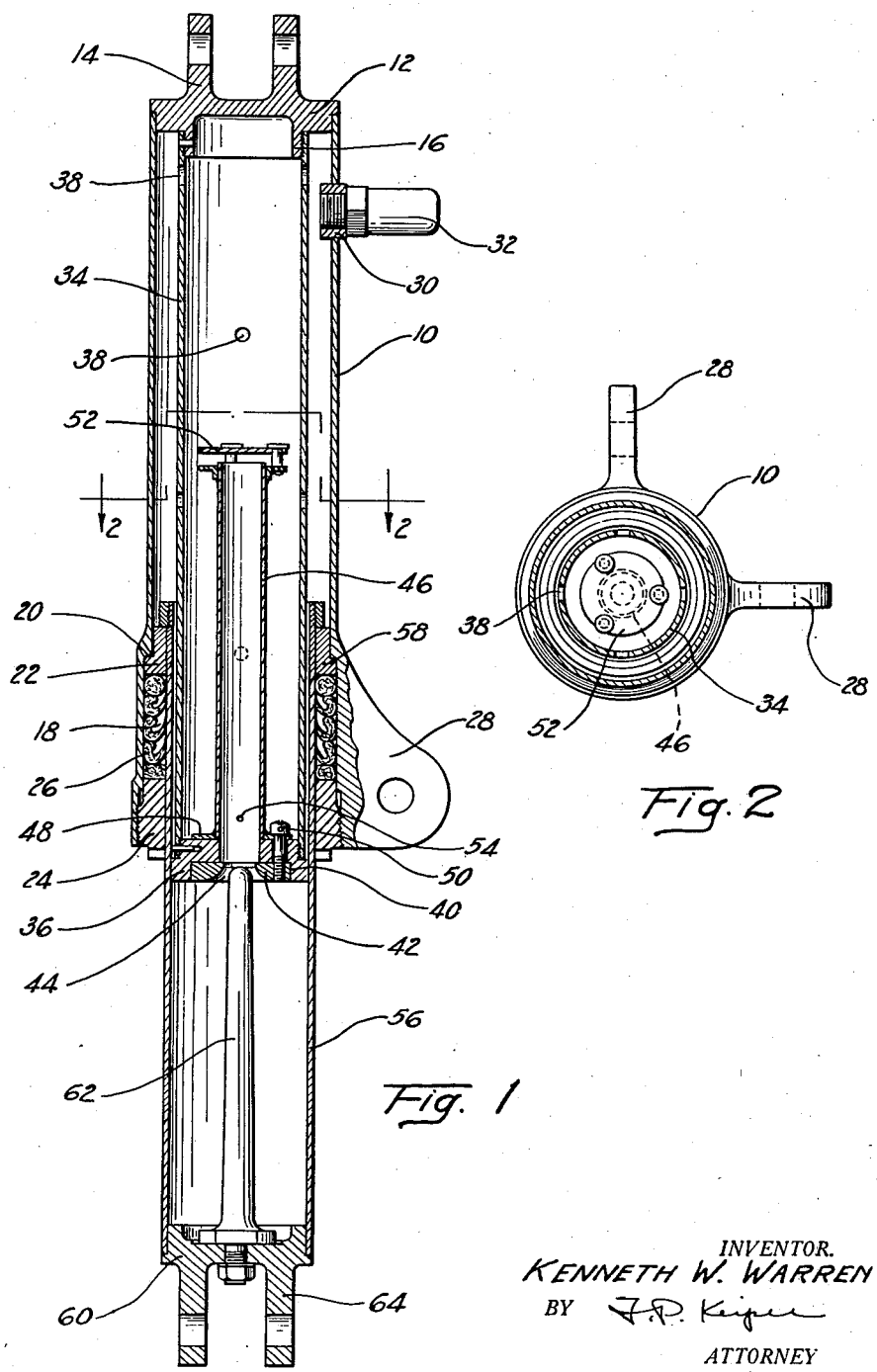

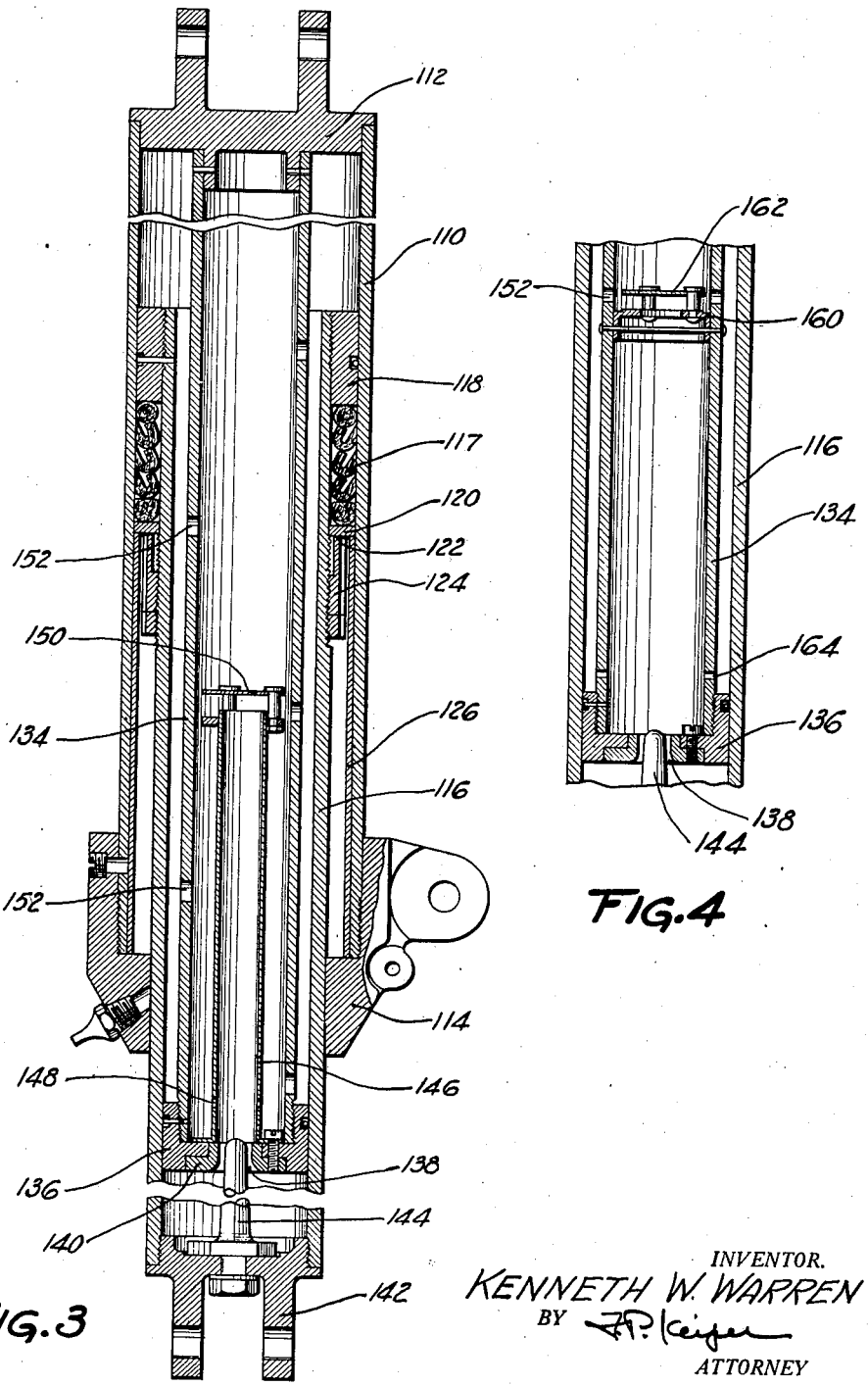

2,042,371

UNITED STATES PATENT OFFICE 2,042,371

SHOCK ABSORBING STRUT

Kenneth W. Warren, South Bend, Ind., assignor to Bendix Aviation Corporation, South Bend, Ind., a corporation of Delaware Application February 9, 1933, Serial No. 656,005

11 Claims. (Cl. 267—64)

This invention relates to shock absorbers and more particularly to hydraulic pneumatic shock absorbing struts for aeroplanes.

Broadly the invention comprehends a shock absorbing strut for aeroplanes including hydraulic and pneumatic resistance means arranged so that the hydraulic means dissipates the larger part of the impact energy on landing an aeroplane, while the pneumatic resistance means takes the taxiing loads.

An object of the invention is to provide a shock absorbing strut for an aeroplane including but few parts arranged to provide the minimum length and yet permit of the attachment of lugs or braces to take side loads at the lowest possible point which is not movable with respect to the aeroplane.

Another object of the invention is to provide a shock absorbing strut for an aeroplane including a jacketed shock absorber of the hydraulic pneumatic type wherein the fluid and air or gas flow freely from a hollow piston rod to the jacket and from the jacket to the hollow piston rod.

Another object of the invention is to provide a shock absorbing strut for aeroplanes in which the amount of required machine operation on the parts during manufacture shall be materially reduced.

A further object of the invention is to provide a shock absorbing strut for an aeroplane having great resistance against side loads and wherein the surface slidably in contact with the packing gland is totally enclosed.

A still further object is to provide a pneumatic hydraulic shock absorbing strut for an aeroplane having great resistance against bending loads and in which the air pressures necessary are considerably reduced.

Yet a further object of the invention is to provide a shock absorbing strut for an aeroplane which has the advantage of a short length, is highly efficient in operation and yet of marked simplicity as a whole and in respect to each of its composite parts, so that its manufacture may be economically facilitated both as regards its parts and assembly.

Other objects of the invention will appear from the following description taken in connection with the drawings, which form a part of this specification, and in which:

Figure 1 is a vertical sectional view of a shock absorbing strut embodying the invention;

Figure 2 is a cross-sectional view substantially in line 2—2, Figure 1;

Figure 3 is a vertical sectional view of a slightly modified form of shock absorbing strut embodying features of the invention; and Figure 4 is a sectional view of a modified flap valve construction adaptable to the structures of Figures 1 and 3.

Referring to the drawings for more specific details of the invention, 10 represents a casing on a jacket closed at one end by a cap 12 having a clevis 14 on the top thereof for attaching the strut to the fuselage of an aeroplane. The cap also has a sleeve 16 extending into the casing concentrically with respect to the wall thereof.

The other end of the casing has a packing chamber 18. The inner end of the packing chamber has a shoulder 20 on which is seated a packing ring 22 and the other end of the packing chamber is threaded to receive a packing nut 24. As shown, the packing nut is elongated and is piloted well into the packing chamber to lend strength and rigidity thereto, and arranged in the packing chamber are packing glands 26 compressible between the packing ring 22 and the packing nut 24.

The outer wall of the packing chamber has formed thereon a plurality of lugs 28 to which brace members, not shown, may be attached, and suitably secured in the wall of the casing 10 adjacent the cap 12 is a short sleeve 30 internally threaded to receive a valve 32 through which the strut may be filled with suitable hydraulic fluid and air or gas under pressure.

A hollow cylinder piston 34 is suitably secured at one end thereof to the sleeve 16, and secured on the other end of the piston is a piston head 36. The piston has a plurality of openings 38 providing for free flow of fluid and air or gas from the piston to the casing and from the casing to the piston.

The piston head has a double diametral bore 40. A case-hardened plate 42 having a metering orifice 44 is fitted in the bore having the larger diameter, and supported on the back of the piston head in registration with the bore having the smaller diameter is a snubbing cylinder 46.

As shown, the snubbing cylinder 46 has a circumferential flange 48 on the end thereof abutting the back of the piston head, and screws 50 passed through the flange, the piston head, and the case-hardened plate securely fasten these parts together. The other end of the cylinder 46 is provided with a flap valve 52 arranged to provide maximum flow of fluid through the cylinder. The snubbing cylinder is further provided with small openings 54 in the wall thereof adjacent the flange 48.

A cylinder 56 is positioned for reciprocation in the packing gland and between the walls of the casing 10 and the piston 34. The inner end of the cylinder 56 has suitably secured thereto a collar 58 seated on the packing ring 22 when the strut is in fully extended position, and the other end of the cylinder is closed by a cap 60 supporting a metering pin 62 for cooperation with the orifice 44 in the case-hardened plate 42. The cap 60 has on the top thereof a clevis 64 for attaching the strut to the axle of an aeroplane.

The modified form of Figure 3 is similar in construction to that of Figure 1 except that the packing is carried upon the internal telescoping or moving cylinder thereby permitting complete enclosure of the surface upon which the packing slides, and completely preventing accumulation of dirt, grit and foreign substances which might in time tend to cause leakage.

As shown, the strut comprises a cylindrical casing member 110 closed at its upper end by a cap 112 and carrying an outer bearing collar member 114 at its lower end, into which a second cylindrical casing member 116 is telescopically arranged. To prevent leakage between the members, a series of packing rings 117 is carried on the second member 116 between a fixed inner bearing collar 118 and a loosely mounted retaining ring 120 which is held in place by engagement with a sleeve 124 threaded on the latter cylindrical member 116, and which forms an adjustable shoulder 122 for said retaining ring. A sleeve 126 set inside of the cylindrical casing member 110 rests at one end upon the collar 114 and forms a shoulder at its other end against which the retaining ring 120 may strike, thereby providing a stop to limit the minimum distance between the inner collar 118 and the outer collar 114, so that a certain amount of overlap of the cylindrical members sufficient to withstand bending loads is always assured. As the sleeve 126 acts on the retaining ring, there is a tendency for the packing 117 to act as a cushion when the cylindrical members are fully extended, and also the packing is more highly compressed which assures against leakage when the members are in the extended or idle position.

As in the form of Figure 1, a hollow cylinder 134 concentric with the outer cylindrical member 110 and secured to the end cap 112 carries at its lower end a piston 136 which is provided with a suitable hard metal bushing 140. Secured to a lower end cap member 142 which is carried by the lower end of the cylindrical telescopic member 116 is a metering pin 144 of varying cross section, which is adapted to cooperate with the orifice 138. Concentrically mounted over the orifice 138 is a tubular member 146 having small side orifices 148 and a valve 150 covering the top which is adapted to permit flow of shock absorbing fluid upwardly only. This construction permits free flow of fluid passing upward through the orifice 138, but restricts the return flow by causing the fluid to pass through the side orifices 148 thereby restricting rebound.

In order that the entire area of the outer cylinder may be effective to resiliently support the load, for example, as during taxiing, thereby permitting lower pressures in the strut, the inner cylindrical member 138 is provided with a plurality of ports 152 in order that free communication is maintained between the inside and the outside of the cylindrical member 134.

As shown in Figure 4, the central tube 146 of Figure 3 may be dispensed with and a diaphragm 160 containing a one-way valve 162 may be directly inserted into the cylindrical member 134. In such an arrangement side orifices 164 for controlling rebound are placed preferably at the base of the cylindrical member 134, and ports 152 for the free communication between the inside and the outside of the cylindrical member 134 are restricted to the portion above the diaphragm 160.

Assuming that either strut, both of which are shown in a fully extended position, is filled with a suitable hydraulic liquid and air or gas under pressure, then the strut will under impact of landing cause the hydraulic liquid to be forced through the metering orifice past the metering pin into the upper part of the strut where the air or gas will be compressed by the rise of the liquid and this combined resistance offered by the compression of the air or gas and the flow of the liquid produces the work curve desired.

On the compression stroke the liquid passes freely through the flap valve on top of the snubbing cylinder 46, into which the metering pin extends, as in Figures 1 and 3 or through the diaphragm as in Figure 4, into the hollow piston and from the hollow piston into the casing or jacket. On the return stroke the flap valve closes, due to the pressure of the compressed air or gas, forcing the liquid to return from the casing or jacket to the hollow piston and from the piston through the small openings near the bottom of the snubbing cylinder, or the corresponding openings 164 of Figure 4, and thence through the metering orifice 44 to the cylinder 56, thus preventing the sudden rebound that would otherwise result.

While the preferred embodiments of the invention have been described, it is to be understood that these are given merely as an example of the underlying principles of the invention and since these may be incorporated in other specific mechanical structures, I do not intend to be limited to those shown except as such limitations are clearly imposed by the impending claims.

Having thus described the various features of the invention, what I claim as new and desire to secure by Letters Patent is:—

1. A shock absorbing strut comprising a casing, a hollow piston supported and fixed concentrically therein, a head on the lower end of the piston having an orifice, a cylinder supported on the head within the piston registering with the orifice, and a flap valve on the other end of the cylinder permitting flow upward therethrough.

2. A shock absorbing strut comprising a casing, a hollow perforated piston rod supported and fixed concentrically therein, a head on the lower end of the piston having an orifice, a cylinder supported on the head concentrically within the piston, and a valve on the cylinder permitting flow upwardly therethrough only.

3. A shock absorbing strut comprising a casing, a closure on one end of the casing, a packing chamber on the other end of the casing, a hollow perforated piston fixed to the closure concentrically within the casing, a head on the piston having a metering orifice, a check valve associated with said orifice to restrict return of flow therethrough, a chamber positioned for reciprocation between the casing and the piston, and a metering pin in the reciprocating chamber adaptable for cooperation with the metering orifice.

4. A shock absorbing strut comprising a casing, a closure on one end of the casing, a packing chamber on the other end of the casing, a packing ring in the packing chamber, a hollow perforated piston fixed to the closure concentrically within the chamber, a head on the piston having a metering orifice, a check valve associated with said orifice to restrict return of flow therethrough, a cylinder positioned for reciprocation between the casing and the piston, a collar on the cylinder adapted to engage the packing ring, and a metering pin carried by the cylinder for cooperation with the metering orifice.

5. A shock absorbing strut comprising a casing, a closure on one end of the casing, a packing chamber on the other end of the casing having a shoulder on the inner end and threaded at the outer end, a packing ring supported on the shoulder, a packing nut threaded into the open end, packing material between the packing ring and the packing nut, a hollow perforated cylinder fixed to the closure concentrically within the casing, a head on the piston having a concentric metering orifice, a check valve associated with said orifice to restrict return of flow therethrough, a cylinder positioned for reciprocation between the inner wall of the casing and the outer wall of the piston, a collar on the cylinder adaptable for engagement with the packing ring, and a metering pin carried by the cylinder for cooperation with the metering orifice.

6. A shock absorbing strut comprising a casing, a closure on one end of the casing, a sleeve on the closure extending concentrically into the casing, a hollow perforated piston having one of its ends secured to and fixed on the sleeve, a piston head secured to the other end of the piston and provided with a concentric orifice, a snubbing cylinder within said hollow perforated piston having one end secured to the back of the head, a flap valve on the other end of the snubbing cylinder, a cylinder positioned for reciprocation between the inner wall of the casing and the outer wall of the piston, and a metering pin carried by the piston adaptable for cooperation with the metering orifice.

7. A shock absorbing strut comprising a casing, a closure on one end of the casing having a sleeve extending concentrically into the casing, a packing chamber on the other end of the casing having a shoulder in one end and internally threaded at its other end, a packing ring seated on the shoulder, a packing nut threaded in the open end of the chamber, packing material between the packing ring and packing nut, a hollow perforated piston rod supported by and fixed on the sleeve within the casing, a head on the piston rod having a concentric metering orifice, a snubbing cylinder within said hollow perforated piston secured by one of its ends to the back of the piston head, a flap valve on the other end of the snubbing cylinder, a cylinder positioned for reciprocation between the inner wall of the casing and the outer wall of the piston, a collar on the cylinder for engagement with the packing ring, and a metering pin carried by the cylinder for cooperation with the metering orifice.

8. A shock absorbing strut comprising a casing, a closure for one end of the casing including a cap having a sleeve extending concentrically within the casing and a clevis on the top of the cap, a packing chamber on the other end of the casing having a shoulder at its inner end and threaded at its outer end, a packing ring seated on the shoulder having a part extending laterally within the casing, a packing nut threaded in the chamber having an unthreaded part extending inwardly, packing material in the chamber between the packing ring and the packing nut, a hollow perforated piston secured to the sleeve on the closure and extending concentrically within the casing, a head secured to the piston having a concentric metering orifice, a snubbing cylinder within said perforated piston having one of its ends secured to the back of the head, a flap valve on the other end of the snubbing cylinder, a cylinder positioned for reciprocation between the inner wall of the casing and the outer wall of the piston, a collar on one end of the cylinder engageable with the packing ring, a closure on the other end of the cylinder including a cap having a clevis, and a metering pin supported by the cap for cooperation with the metering orifice.

9. A shock absorbing strut comprising a casing, a closure on one end of the casing, a sleeve on the closure extending concentrically into the casing, a hollow piston having one of its ends secured to the sleeve, a piston head secured to the other end of the piston and provided with a central orifice, a snubbing diaphragm secured within the hollow piston, a flap valve thereon, a cylinder positioned for reciprocation between the inner wall of the casing and the outer wall of the piston, and a metering pin carried by the piston adaptable for cooperation with the orifice.

10. A shock absorbing strut comprising a casing, a closure on one end of the casing, a sleeve on the closure extending concentrically into the casing, a hollow piston having one of its ends secured to the sleeve, a piston head secured to the other end of the piston and provided with a central orifice, a snubbing diaphragm secured within the hollow piston, a flap valve thereon, perforations in the wall of the hollow piston above the diaphragm, a cylinder positioned for reciprocation between the inner wall of the casing and the outer wall of the piston, and a metering pin carried by the piston adaptable for cooperation with the orifice, said flap valve being located a distance from said piston head substantially the length of said metering pin.

11. A shock strut comprising a pair of concentric cylinders secured and capped at one end, a telescopic cylinder mounted for reciprocation between said concentric cylinders, a bearing collar mounted on the end of the telescopic cylinder and adapted to engage the inner wall of the outer cylinder, a bearing collar on the end of the outer cylinder adapted to engage the outer surface of the telescopic cylinder, a sleeve positioned on said second named collar between said outer cylinder and telescopic cylinder, and a packing retained on said telescopic cylinder in position against said first named collar, said packing adapted to engage said sleeve and limit the maximum extending movement of the shock strut.

KENNETH W. WARREN.